US009718005B2

(12) United States Patent
Klein et al.

(10) Patent No.: US 9,718,005 B2
(45) Date of Patent: Aug. 1, 2017

(54) FUEL FILTER OF AN INTERNAL COMBUSTION ENGINE, AND FILTER ELEMENT OF A FUEL FILTER

(71) Applicant: MANN+HUMMEL GMBH, Ludwigsburg (DE)

(72) Inventors: Martin Klein, Ludwigsburg (DE); Martin Veit, Gaertringen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 336 days.

(21) Appl. No.: 14/299,611

(22) Filed: Jun. 9, 2014

(65) Prior Publication Data

US 2014/0284264 A1    Sep. 25, 2014

Related U.S. Application Data

(63) Continuation of application No. PCT/EP2012/072453, filed on Nov. 13, 2012.

(30) Foreign Application Priority Data

Dec. 9, 2011    (DE) .................. 10 2011 120 647

(51) Int. Cl.
    *B01D 29/58* (2006.01)
    *B01D 35/00* (2006.01)
    (Continued)

(52) U.S. Cl.
    CPC ........... *B01D 29/58* (2013.01); *B01D 17/045* (2013.01); *B01D 35/005* (2013.01);
    (Continued)

(58) Field of Classification Search
    CPC .... B01D 29/58; B01D 35/005; B01D 36/003; B01D 17/045; B01D 2201/291; F02M 37/221
    (Continued)

(56) References Cited

U.S. PATENT DOCUMENTS

| 4,372,847 A | 2/1983 | Lewis |
| 6,422,396 B1 * | 7/2002 | Li ................... B01D 17/0214 |
| | | 210/489 |

(Continued)

OTHER PUBLICATIONS

PCT search report of PCT/EP2012/072453, dated Aug. 2, 2013.

*Primary Examiner* — Madeline Gonzalez
(74) *Attorney, Agent, or Firm* — James Hasselbeck

(57) ABSTRACT

Disclosed is a fuel filter (10) for fuel, in particular diesel fuel, of an internal combustion engine, in particular of a motor vehicle, and to a filter element of such a fuel filter. A housing (12) has at least one fuel inlet (26) for the fuel to be cleaned, at least one fuel outlet (18) for cleaned fuel, and at least one water outlet (30) for water which has been separated from the fuel. The filter element (36) is arranged in the housing (12), said filter element sealingly separating the fuel inlet (26) from the fuel outlet (18). The filter element (36) has a filter medium (38) which is designed as a hollow body and which can be permeated from the inside to the outside or from the outside to the inside in order to filter the fuel. The filter element (36) has a coalescing medium (58) designed as a hollow body for separating water contained in the fuel. The coalescing medium (58) is arranged downstream of the filter medium (38) in the flow path (78) of the fuel, around said filter medium, or in the interior (45) delimited by the filter medium. The coalescing medium (58) includes at least one regenerated-fiber coalescing system consisting of a coalescing material (60) which is suitable for coalescing water and which has at least 20 wt. % of regenerated fibers, preferably at least 50 wt. %.

17 Claims, 2 Drawing Sheets

(51) Int. Cl.
*B01D 17/04* (2006.01)
*F02M 37/22* (2006.01)
*B01D 36/00* (2006.01)

(52) U.S. Cl.
CPC ......... B01D 36/003 (2013.01); F02M 37/221 (2013.01); *B01D 2201/291* (2013.01)

(58) Field of Classification Search
USPC .......... 210/DIG. 5, 490, 491, 505, 508, 315, 210/338, 443, 440, 437, 435, 489
See application file for complete search history.

(56) References Cited

U.S. PATENT DOCUMENTS

2011/0084028 A1\* 4/2011 Stanfel ................. B01D 17/045
 210/708
2011/0147299 A1\* 6/2011 Stanfel ................. B01D 17/045
 210/491

\* cited by examiner

FUEL FILTER OF AN INTERNAL COMBUSTION ENGINE, AND FILTER ELEMENT OF A FUEL FILTER

CROSS-REFERENCE TO RELATED APPLICATIONS

This application is a continuation application of international application No. PCT/EP2012/072453 having an international filing date of Nov. 13, 2011 and designating the United States, the international application claiming a priority date of Dec. 9, 2011, based on prior filed German patent application No. 10 2011 120 647.0, the entire contents of the aforesaid international application and the aforesaid German patent application being incorporated herein by reference.

TECHNICAL FIELD

The invention relates to a fuel filter for fuel, in particular diesel fuel, of an internal combustion engine in particular of a motor vehicle, having a housing, which comprises at least one fuel inlet for the fuel to be cleaned, at least one fuel outlet for cleaned fuel and at least one water outlet for water which has been separated from the fuel and in which housing a filter element is arranged, which sealingly separates the fuel inlet from the fuel outlet and which filter element has a filter medium which is designed as a hollow body, which can be permeated from the inside to the outside or from the outside to the inside in order to filter the fuel, and which has a coalescing medium designed as a hollow body for separating water contained in the fuel.

Furthermore, the invention relates to a filter element of a fuel filter for fuel, in particular diesel fuel, of an internal combustion engine in particular of a motor vehicle, which can be arranged in a housing of the fuel filter in such a way that it sealingly separates a fuel inlet of the housing from a fuel outlet, and which comprises a filter medium designed as a hollow body, which can be permeated from the inside to the outside or from the outside to the inside in order to filter the fuel, and which comprises a coalescing medium designed as a hollow body for separating water contained in the fuel.

BACKGROUND

A tubular coalescing filter element for separating water from a liquid fuel, in particular diesel fuel, is known from GB 1 393 359. In the process, the to-be-filtered diesel fuel passes through a plurality of layers of the filter element. The filter element comprises at least one tubular layer of a fibrous filter material and at least one concentric permeable layer, which is designed of a thermoplastic material. The permeable layer can be a woven thermoplastic material, in particular polypropylene, nylon, polytetrafluoroethylene, viscose or an acrylic plastic. The fibrous filter material can contained glass fibers. The permeable layer of thermoplastic material can be arranged between two outer layers made of fibrous material.

The object of the invention is designing a fuel filter and a filter element of a fuel filter of the type cited at the outset which improve the filtering of particles from the fuel and the separating of water contained in the fuel.

SUMMARY OF THE INVENTION

An object of the invention is providing a fuel filter and a filter element of a fuel filter of the type cited at the outset which improve the filtering of particles from the fuel and the separating of water contained in the fuel.

This object is attained according to the invention in that the coalescing medium is arranged downstream of the filter medium in the flow path of the fuel, around said filter medium or in the interior delimited by the filter medium, and the coalescing medium comprises at least one regenerated-fiber coalescing layer consisting of a coalescing material which is suitable for coalescing water and which has a percent by weight of at least 20%, preferably at least 50% regenerated fibers.

The filter element according to the invention is multi-stage. Viewed in the flow direction, the coalescing medium can preferably be arranged downstream of the filter medium. The filter medium can advantageously be multilayer. It can advantageously be folded. The filter is used to filter out in particular particles contaminating the fuel. The filter medium can preferably be free of glass fibers.

Even the smallest water droplets contained in the fuel are coalesced into larger drops of water at the coalescing medium. In this process, the fine water droplets are held back at the coalescing material and increased until they are carried away again by the flow of fuel and discharged from the coalescing medium. The coalescing medium can have at least one narrow-pored layer, which is arranged in the flow direction preferably directly after the filter medium. The at least one narrow-pored layer of the coalescing medium can preferably be wound. The at least one narrow-pored layer can be designated as a pre-coalescing layer, with which the smallest water droplets are collected and in a first stage can be coalesced into larger water droplets.

Furthermore, the coalescing medium can have a single layer or multi-layer stage containing regenerated fibers. The stage of the coalescing medium containing regenerated fibers can preferably be wound. The coalescing material of the stage containing viscose can preferably have wider pores than the coalescing material of the at least one narrow-pored layer of the coalescing medium. The stage containing viscose can preferably be arranged in the flow direction downstream of the narrow-pored layer. In the stage containing viscose, the smallest water droplets that are coalesced into larger water droplets in the at least one narrow-pored layer can be collected and coalesced into even larger water droplets.

A supporting body can be arranged downstream from the filter element. The supporting body can advantageous have ribs. The rib arrangement makes it possible to realize a larger total passage surface than with a wall, which has a plurality of passage openings. The upstream filter medium protects the coalescing medium from contamination.

The advantage of regenerated fibers is that they do no lose their function as a coalescing material when in contact with the fuel, in particular with additives that are found in diesel fuel. In contrast to this, coalescing materials known from the prior art, in particular those containing glass fibers or impregnated cellulose, lose their coalescing function when in contact with diesel fuel so that water drops are able to pass through virtually without being increased. Furthermore, regenerated fibers have optimum hydrophilic properties so that they are able to efficiently trap and coalesce the water drops. In the case of a percent by weight of at least 20%, preferably at least 50%, regenerated fibers achieve very good results with respect to coalescence, pressure losses, stability and service life.

In the case of one advantageous embodiment, the coalescing material of the at least one regenerated-fiber coalescing layer can consist of a non-woven material. Non-woven coalescing material can be manufactured in a simple manner. In particular, the coalescing material of the regenerated-fiber coalescing layer is a fleece or fibrous web.

During manufacturing, the coalescing material can be solidified in particular by hydroentanglement or by needle bonding. In this way, loose, individual fibers are merged together into a fibrous web.

The coalescing medium can preferably comprise a plurality of several layers of regenerated-fiber material with a percent by weight of at least 50% regenerated fibers. The high percentage of regenerated fiber makes it possible to improve the separation of water drops.

A preferred direction can be specified for the fibers thereby enabling the coalescing function to be improved. The coalescing material can thus comprise different expandabilities in oblique directions due the alignment of the fibers to each other.

The thickness of the at least one layer of the coalescing material containing viscose can advantageously be between approx. 0.5 mm and 1.5 mm. An air permeability of the at least one layer of the coalescing material containing viscose can advantageously be provided to be at least approx. 500 L/m²s with a pressure difference between the clean side and the raw side of approx. 200 Pa. All indications of thickness relate to a thickness measured in accordance with German Industry Standard DIN EN ISO 9073-2. The information about air permeability is determined according to a measuring method specified in German Industry Standard DIN EN ISO 9237.

The total thickness of the at least one layer of coalescing material containing viscose can advantageously be between approx. 1 mm and approx. 10 mm. It is possible with the coalescing medium according to the invention for emulsified water drops in the fuel to be increased from an original size of in particular approx. 1 µm to approx. 90 µm to greater than approx. 100 µm. In the process, in the case of pre-coalescence through a meltblown layer, it is possible to increase water drops with an original size of approx. 1 µm to approx. 30 µm to a size of approx. 20 µm to approx. 90 µm.

The water drops can be precipitated downstream from the coalescing medium in particular in a precipitation gap. The precipitation gap can be advantageously limited on the side opposite from the coalescing medium through a separating medium. The water drops are able to sink downward because of their specific weight.

Fuels whose specific weight is greater than that of water can also be cleaned with the fuel filter according to the invention, in which the water drops analogously rise spatially upward. For this purpose, the filter element can be arranged in an inverted manner. Accordingly, the fuel inlet, the fuel outlet and the water outlet can be arranged expediently in a different manner.

The water can be collected advantageously in a water accumulator advantageously, which is connected to the water outlet. If it is advantageously provided that the filter medium is permeated radially from the inside to the outside, the coalescing medium is preferably situated outside the filter medium and surrounding said filter medium. If it is alternatively provided that the filter medium is permeated radially from the outside to the inside, the coalescing medium can preferably be situated in the interior of the filter medium.

Furthermore, the housing can be advantageously openable and the filter element can be arranged in the housing so that it is replaceable. As a result, it is possible to simply remove the filter element from the housing for replacement or maintenance purposes.

In an especially preferred exemplary embodiment of the invention, the regenerated fibers of the coalescing material of the at least one regenerated-fiber coalescing layer are Lyocell fibers. Lyocell fibers are industrially produced regenerated fibers consisting of cellulose, which are manufactured using the direct solvent method. Lyocell fibers are available e.g., from Lenzing AG under the brand name of Tencel fibers. The Lyocell fibers are characterized by especially good coalescing properties. This applies in particular in the case of a coalescing material with a percent by weight of at least virtually 100% Lyocell fibers.

Very good coalescing properties are likewise shown by a regenerated-fiber coalescing layer, which comprises the regenerated fibers in the form of viscose fibers. Practice has shown that, in the case of viscose fibers, the coalescing material of the at least one regenerated-fiber coalescing layer should advantageously have a percent by weight of less than 95% viscose fibers.

In the case of another advantageous embodiment, the coalescing material can comprise, in addition to the viscose fibers, a hydrophobic polymer, in particular a hydrophobic polyester, especially polyethylene terephthalate (PET). It is possible for the hydrophobic polymer to stop and collect the water drops. In this way, the coalescing properties of the coalescing materials are further improved.

The coalescing material of the regenerated-fiber coalescing layer can consist advantageously substantially of viscose fibers having a percent by weight of approx. 80% and a hydrophobic polymer having a percent by weight of approx. 20%. This type of coalescing material has proven itself in practice and has especially good coalescing properties.

In the case of another advantageous embodiment, the coalescing medium in the flow path of the fuel in front of the regenerated-fiber coalescing layer, preferably in the flow path of the fuel directly in front of the regenerated-fiber coalescing layer, can have at least one pre-coalescing layer, which is formed in particular of coalescing material, which is more fine-pored than the coalescing material of the regenerated-fiber coalescing layer. In this context "directly" means that the pre-coalescing layer fits closely on the regenerated-fiber coalescing layer, in particular fits flat against it. In this way, a preliminary stage and a main stage are realized in order to trap even the smallest water drops and coalesce them into larger drops.

The coalescing medium in flow direction in front of the regenerated-fiber coalescing layer can advantageously comprise a pre-coalescing layer comprised of a synthetic, in particular non-woven, coalescing material, which comprises in particular polyester, wherein the pre-coalescing layer can be configured preferably as a meltblown layer or a layer of spunbond. Synthetic materials can be manufactured easily and are stable. They can be equipped with resistance to chemical and/or physical stress.

The total thickness of the pre-coalescing layer can advantageously be between approx. 0.1 mm and approx. 0.9 mm. The air permeability of the pre-coalescing layer can advantageously be between approx. 30 L/sm² to approx. 150 L/sm² with a differential pressure of approx. 200 Pa (German Industry Standard DIN EN ISO 9237).

The fiber diameter of the pre-coalescing layer, in particular of the synthetic material of the meltblown layer, can advantageously be between approx. 0.8 µm and approx. 10 µm. In this way, the water drops from the fuel can be increased to an optimal size. The fiber diameters can be determined in this case by means of a scanning electron microscope (SEM).

The layer of synthetic material in the flow direction in front of the at least one layer of the coalescing material containing regenerated fibers can be situated advantageously in the coalescing medium. In this way, the coalescing material containing regenerated fibers can also be protected from contamination.

The coalescing medium in the flow path of the fuel after the regenerated-fiber coalescing layer can comprise advantageously at least one, preferably a plurality of, additional coalescing layers, which is/are preferably formed of a coalescing material, which has a percent by weight of at least 20% regenerated fibers, in particular is/are formed of the same coalescing material as the regenerated-fiber coalescing layer. The advantage of this is that a comparatively thick coalescing media can also be manufactured simply. A thick coalescing medium can be manufactured more simply from a plurality of thin regenerated-fiber coalescing layers than from a single regenerated-fiber coalescing layer.

Furthermore, the coalescing material of the at least one regenerated-fiber coalescing layer can advantageously have a weight per unit area of between 75 g/m$^2$ and 170 g/m$^2$. In the case of a regenerated-fiber coalescing layer having viscose fibers, a coalescing material with a weight per unit area of approx. 100 g/m$^2$ has been proven, and in the case of a regenerated-fiber coalescing layer having Lyocell fibers, a coalescing material with a weight per unit area of approx. 150 g/m$^2$ has been proven. The coalescing material of a pre-coalescing layer can preferably have a weight per unit area of between 80 g/m$^2$ to 120 g/m$^2$. The permeability and coalescing efficiency in particular can be improved with such a weight per unit area.

The coalescing material of the regenerated-fiber coalescing layer can advantageously have an average pore diameter of approx. 60 μm to 150 μm and/or the coalescing material of a pre-coalescing layer can have an average pore diameter of approx. 1 μm to 30 μm. The foregoing range specifications for the average pore diameter are yielded from the proven determination method of capillary pressure measurement (bubble point test). The average pore diameter is yielded from the measured values at the measuring point at which the entire sample surface is occupied by air bubbles. The measurement was carried out with 96% ethanol.

In another advantageous embodiment, the coalescing medium can be directly adjacent to a clean side of the, in particular folded, filter medium, in particular filter medium with the coalescing medium wrapped around it. The coalescing medium can be directly adjacent, i.e., without any distance, to the filter medium. No supporting body is necessary to support the coalescing medium, which reduces component and assembly expenditures. In this manner, a coalescing medium can also be used that by itself does not have sufficient dimensional stability. Therefore, the filter medium is also able to provide the stabilization and shaping of the coalescing medium. Furthermore, the manufacturing is thereby simplified because, in the case of a filter medium that is permeated radially from the inside to the outside, the coalescing medium can be wrapped around the previously manufactured filter medium.

Furthermore, the filter medium, the coalescing medium and, if applicable, the separating medium can advantageously be arranged coaxially. A coaxial arrangement saves space. Moreover, with a coaxial arrangement, a flow progression of the fuel radially from the outside to the inside or radially from the inside to the outside can be optimized simply. In this case, the surface area of the filter medium, of the coalescing medium and of the separating medium can be similar. However, the surface areas can also be different. They can be oval or angular in particular. The filter element can advantageously be a round filter element. Round filter elements can be constructed to be especially space-saving. Round filter elements make it possible to realize an optimal ratio of the filter/separation surface to the construction space. The first stage of the filter element can advantageously be a star-shaped folded filter bellows. Depending upon the permeation direction, the subsequent stage can be a cylindrical body wrapped thereon or therein with the coalescing material.

In the case of permeation from the outside to the inside, the second stage can be supported on a central tube or another supporting component, which can be arranged concentrically to the first two stages. In the case of permeation from the inside to the outside, the coalescing material can be wound directly on the finished bellows of the filter medium and in particular be firmly adhered against the internal pressure and/or be supported by another outer structure.

In addition, a fixed grid can advantageously be wrapped up with it. The filter medium and the coalescing medium can be connected advantageously on the face side to common end plates, in particular be adhered or embedded.

The coalescing material of the regenerated-fiber coalescing layer and/or a pre-coalescing layer can advantageously comprise an expandability or elasticity in the circumferential direction of the coalescing medium which is less than the expandability or elasticity in the axial direction of the coalescing medium, in particular the expandability or elasticity in the circumferential direction can be several times less than in the axial direction. "Axial" and "in the circumferential direction" relate in this case to an axis of the fuel filter and not to an axis of a fabrication facility. In this manner, the coalescing material can be optimally wound. In the case of the permeation direction from the radial inside to the outside, the coalescing material can therefore simply be stretched on the filter medium.

The object according to the invention is furthermore attained by the filter element in that the coalescing medium is arranged downstream of the filter medium in the flow path, around said filter medium or in the interior delimited by the filter medium, and the coalescing medium comprises at least one layer of a coalescing material suitable for coalescing water, which has a percent by weight of at least 20% regenerated fibers, preferably of 50%. The advantages and features enumerated in conjunction with the fuel filter according to the invention apply correspondingly to the filter element according to the invention.

BRIEF DESCRIPTION OF THE DRAWINGS

Additional advantages, features and details of the invention will be made clear in the following description in which an exemplary embodiment of the invention will be explained in more detail based on the drawing. A person skilled in the art will also consider individually the features disclosed in combination in the drawing, the description and the claims and combine them into further meaningful combinations. The following is shown schematically:

The same components are provided with the same reference numbers in the figures.

DETAILED DESCRIPTION

Figure 1:
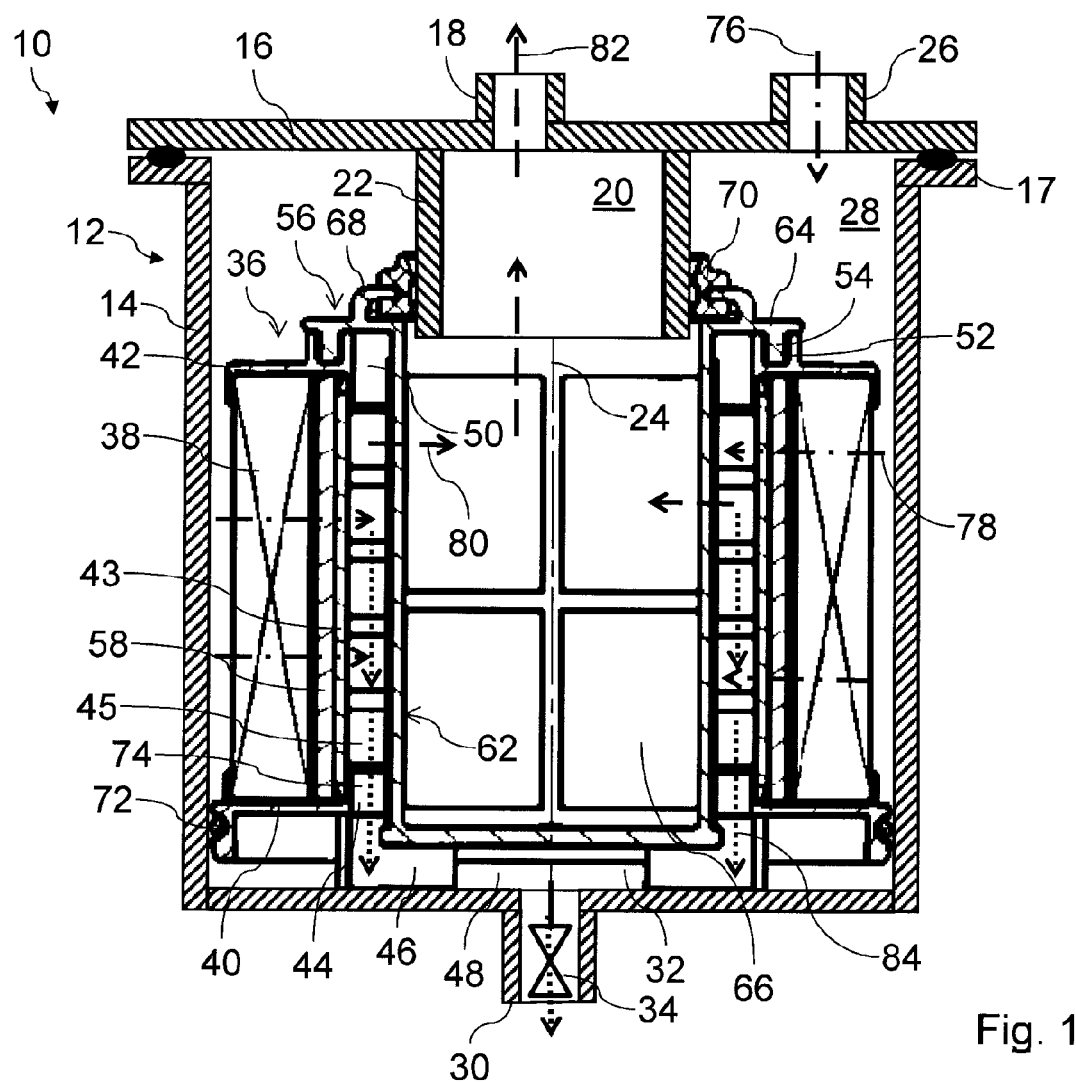
FIG. 1A longitudinal section of a fuel filter with a replaceable three-stage filter element that comprises a coalescing medium with viscose fibers.

FIG. 1 shows a longitudinal section of a fuel filter 10 of a fuel system of an internal combustion engine of a motor vehicle. The fuel filter 10 is serves to clean the fuel used to operate the internal combustion engine, for example diesel fuel. Furthermore, the fuel filter 10 is used to separate water contained in the fuel.

The fuel filter 10 has a two-part housing 12 with a cup-shaped filter head 14 and a filter cover 16, which is arranged in a separable manner on the filter bowl 14. A ring seal 17 is arranged between the filter bowl 14 and the filter cover 16.

Arranged approximately centrally in the cover 16 is an outlet port 18 for the cleaned fuel, which is connected outside the housing 12 to a fuel drainage line (not shown in FIG. 1). Inside the housing 12, the outlet port 18 is connected to a drainage chamber 20 in an interior space of a connecting piece 22. The connecting piece 22 extends on the side of the cover 16 facing the inside of the housing 12 coaxially to a filter axis 24. The filter axis 24 runs spatially vertically, as depicted in FIG. 1, in the normal installation position and under normal operating conditions of the internal combustion engine. Unless otherwise indicated, in the following "axial", "radial", "coaxial" and "circumferentially" relate to the filter axis 24.

Radially outside the connecting piece 22, the cover 16 comprises an inlet port 26 for the fuel to be cleaned, which is connected to a supply chamber 28 in the housing 12. Outside the housing 12, the inlet port 26 is connected to a fuel supply line (not shown in FIG. 1) for the fuel.

A water drainage port 30 is arranged in the base of the filter bowl 14 coaxially to the filter axis 24. The water drainage port 30 is connected to a water accumulator 32 in the lower section of the housing 12. Outside the housing 12, the water drainage port 30 is connected to a water drain line (not shown), via which the water separated from the fuel can be drained from the housing 12. A water drain valve 34 with a water level sensor is arranged in the water drainage port 30. In a resting state, the water drain valve 34 is closed so that no fluid from the water accumulator 32 can escape from the housing 12 through the water drainage port 30. When a predetermined maximum water level is reached in the water accumulator 32, the water drain valve 34 opens automatically, allowing the separated water to drain out of the water drainage port 30.

A replaceable filter element 36 is arranged in the housing 12. The filter element 36 is configured as a round filter element. The filter element 36 sealingly separates the inlet port 26 from the outlet port 18. The filter element 36 comprises a star-shaped folded filter medium 38, with which particles in particular are filtered out of the fuel to be cleaned. Overall the filter medium 38 has the shape of a coaxial circular cylinder jacket. The filter medium 38 consists of one or a plurality of layers of a filter material that is preferably free of glass fibers. On a lower front side facing the base of the filter bowl 14, the filter medium 38 is sealingly connected to a terminal end plate 40. On the opposite upper front side thereof facing the cover 16, the filter medium 38 is sealingly connected to a connecting end plate 42. Extending between the connecting end plate 42 and the terminal end plate 40 in an interior 45 of the filter medium 38 is a skeletal, fluid permeable central tube 43, which stably connects the two end plates 40 and 42 to each other. The central tube 43 consists of axial ribs, which are connected to one another via annular circumferential ribs.

The terminal end plate 40 comprises a coaxial opening 44. The opening 44 is surrounded by the central tube 43. The opening 44 connects the interior 45 to the water accumulator 32. On the outside facing the base of the filter bowl 14, the terminal end plate 40 has four supporting bars 46, extending in a uniformly distributed manner along an intended coaxial circular cylinder jacket. The intended circular cylinder jacket surrounds the opening 44 and the water drainage port 30. The filter element 36 is supported against the base of the filter bowl 14 with the supporting bars 46. Situated between the supporting bars 46 are connecting openings 48, via which the water in the water accumulator 32 is also able to be distributed radially outside the supporting bars 46.

The connecting end plate 42 comprises a coaxial opening 50. The opening 50 is surrounded by two coaxial projections extending in the axial direction on the outside of the connecting end plate 42. The two projections delimit a receptacle groove 52 for a ring-like insertion web 54 of a separation unit 56 of the filter element 36.

A coaxial coalescing medium 58 is situated between the radial inner circumferential side of the filter medium 38 and the central tube 43. The coalescing medium 58 is directly adjacent and without any distance to the radial inner circumferential side of the filter medium 38. The coalescing medium 58 is closed circumferentially and extends between the connecting end plate 42 and the terminal end plate 40. The coalescing medium 64 serves to bring together even the smallest water droplets contained in the fuel into larger water drops.

Figure 2:
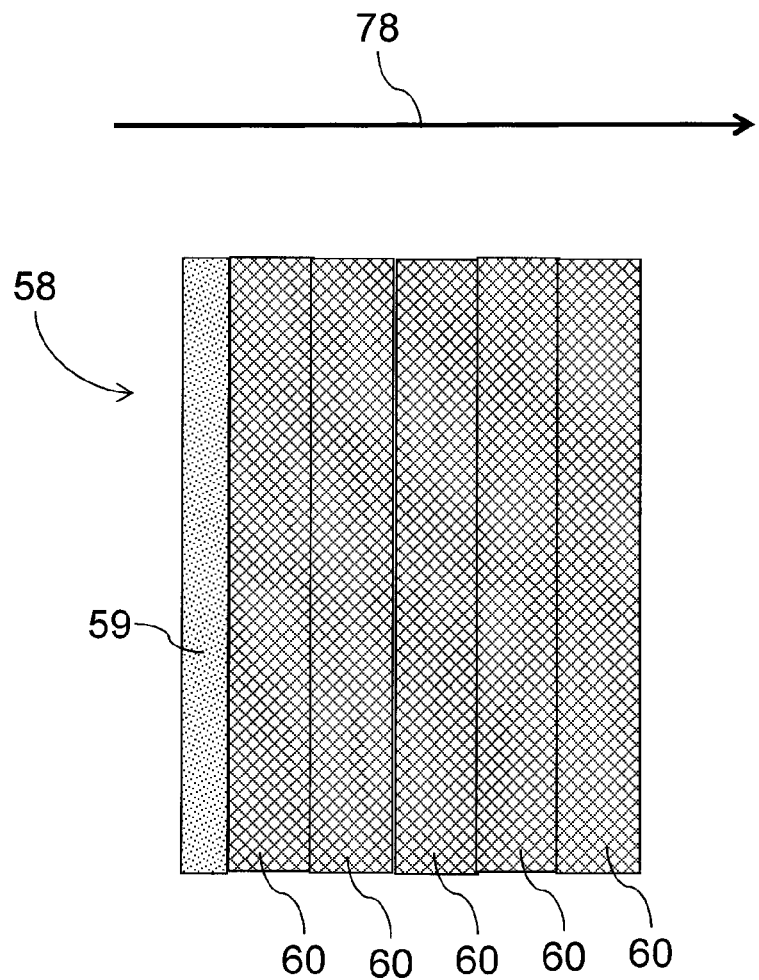
FIG. 2 A detailed view of the coalescing medium from FIG. 1.

The coalescing medium 58 consists, as FIG. 2 shows in detail, a meltblown layer 59, which is situated radially outwardly, and five layers of a coalescing material 60 (regenerated-fiber coalescing layers).

The meltblown layer 59 is made of polyester and is manufactured in accordance with a meltblown method. The meltblown layer 59 has a thickness of approx. 0.1 mm to 0.9 mm. The air permeability thereof is between approx. 30 $l/sm^2$ and approx. 150 $l/sm^2$ with a pressure of approx. 200 Pa.

The coalescing material 60 consists of non-woven, hydrophilic viscose fibers with a percent by weight of greater than 50%, preferably greater than 80%, and polyester with a percent by weight of less than 50%, preferably less than 20%. It has a weight per unit area von approx. 100 $g/m^2$. The coalescing material 60 is manufactured by needle bonding. The coalescing material 60 has an expandability in the circumferential direction of approx. 15% to approx. 30%. In the axial direction, the coalescing material 60 has an expandability of approx. 90% to approx. 150%. The coalescing material 60 is more wide-pored than the meltblown layer 59. The coalescing material 60 has an average pore diameter of approx. 60 μm to approx. 150 μm. The layer thickness of individual layers is between approx. 0.5 mm and approx. 1.5 mm. The air permeability of the individual layers of the coalescing material 60 is greater than approx. 500 $l/sm^2$ with approx. 200 Pa. The total thickness of all five layers of the coalescing material 60 is between 1 mm and 10 mm, depending on the thickness of the individual layers.

In an alternative design (not shown), the coalescing material can comprise non-woven, hydrophilic Lyocell fibers with a percent by weight of at least virtually 100% and a weight per unit area of approx. 150 $g/m^2$. Apart from that, this alternative design corresponds to the depicted design, however.

The separation unit 56 has a support cage 62 with a connecting section 64, which also comprises the insertion web 58, and a separating medium 66.

The connecting section 64 is approximately disk-shaped with a coaxial opening, into which the connecting piece 22 of the cover 16 projects. On the outside thereof facing the cover 16, the connecting section 64 has a coaxial connecting port 68. The connecting port 68 is bent radially inwardly by 90 degrees on the front side thereof. A profile ring seal 70 sits on the radial inner edge of the connecting port 68. The connecting piece 22 is inserted into the connecting port 68 in such a way that the connection to the profile ring seal 70 is sealed.

The separation unit 56 with the separating medium 66 in front is inserted axially through the opening 50 of the connecting end plate 42. The support cage 62 and the separating medium 66 are situated in the interior delimited by the coalescing medium 58, i.e., also in the interior 45 of the filter medium 38.

The separating medium 66 consists of a hydrophobic sieve fabric. It is shaped like a tube that is coaxial to the filter axis 24. It extends from the connecting end plate 42 to the terminal end plate 40. The separating medium 66 is closed circumferentially.

The circumferential wall of the support cages 62 is constructed to be lattice-like and fluid-permeable. The support cage 62 is open on the front side thereof facing the connecting piece 22. The lower front side front side of the support cage 62 facing the water accumulator 32 is closed. The separating medium 66 is adjacent to the radial outer circumferential side of the support cage 62.

A precipitation gap 74 is situated in the interior 45 between the separating medium 66 and the coalescing medium 58. The precipitation gap 74 is shaped like an annulus. The precipitation gap 74 is delimited radially outwardly by the coalescing medium 58 and radially inwardly by the separating medium 66.

Also arranged on the radial outward circumferential side of the terminal end plate 40 is a ring seal 72, which is supported radially outwardly against the radial inner circumferential side of the filter bowl 14. The ring seal 72 seals the supply chamber 28 off from the water accumulator 32.

When the fuel filter 10 is being operated, the fuel to be cleaned is conveyed from the fuel supply line, indicated by arrow 76, through the inlet port 26 to the supply chamber 28.

The fuel flows through the filter medium 38, indicated by arrow 78, from the raw side thereof radially outside to the clean side thereof radially inside. In the process, the fuel is freed of particles. The filter medium 38 forms a first stage of the overall three-stage fuel filter 10 for the cleaning/water separation.

On the clean side, the fuel freed of the particles flows through the coalescing medium 58 from the radial outside to the inside. In the process, first the meltblown layer 59 is permeated and then the five layers of coalescing material 60. In the coalescing material 60, even the smallest water droplets contained in the fuel are trapped on the hydrophilic fibers of the viscose and coalesced into larger water drops. Emulsified water drops in the fuel can thus be increased from an original size of approx. 1 μm to approx. 90 μm, for example, to greater than 100 μm. In the process, in the case of a pre-coalescence through the meltblown layer 59, water drops with an original size of approx. 1 μm to approx. 30 μm can be increased to approx. 20 μm to approx. 90 μm. The coalescing medium 58 forms a second stage for the cleaning/water separation. Once the drop size is adequate, the large water drops are carried away again by the permeating fuel.

The fuel and the large water drops flow through the openings between the ribs of the central tube 43 and reach the precipitation gap 74.

The fuel flows through the separating medium 66, which forms a third stage for the cleaning/water separation, from the radial outside to the inside, indicated by arrow 80, and reaches upward into the drainage chamber 20. The fuel that is cleaned and freed of water exits the drainage change 20 via the outlet port 18, indicated by arrow 82, and is conveyed to the fuel drainage line.

On the other hand, the large water drops are held back by the separating medium 66. Said water drops sink downward (indicated by arrow 84) in the precipitation gap 74 into the water accumulator 32 due to their specific weight that is greater as compared with fuel.

As soon as the water level sensor of the water drain valve 34 detects that the predetermined maximum level has been reached, the water drain valve 34 opens automatically. The water exits the water accumulator 32 through the water drainage port 30 and reaches the water discharge line.

The cover 16 is removed from the filter bowl 14 in the axial direction for maintenance purposes, for example for replacing or for cleaning the filter element 36. The filter element 36 is then extracted from the filter bowl 14 in an axial direction.

For installation, the filter element 36 is inserted into the filter bowl 14 in the axial direction with the terminal end plate 40 in front. Then the cover 16 is inserted on the open side of the filter bowl 14 in the axial direction with the connecting piece 22 in front so that the connecting piece 22 projects sealingly into the profile ring seal 70.

The following modifications, among others are possible in the case of the exemplary embodiment of a fuel filter 10 and of a filter element 36 that was described above:

The invention is not limited to a fuel filter 10 of an internal combustion engine of a motor vehicle. In fact, it can also be used in different internal combustion engines, for example with industrial engines.

The fuel filter 10 can also be used for cleaning/water separation of a different liquid fuel instead of diesel fuel. If a fuel is used whose specific weight is greater than water, the water drops rise analogously. In this case, the filter element 36 can be arranged in an inverted manner. The fuel inlet, the fuel outlet and the water outlet can also be arranged accordingly.

Instead of the meltblown layer 59, a different layer made of a synthetic material, for example polyester, can be provided. The layer of the synthetic material can also be manufactured using different process instead of a meltblown process, for example according to a spunbond process.

More than one meltblown layer 59 or more than one layer of a corresponding synthetic material can also be provided. It is also possible to dispense with the meltblown layer 59.

The layer thickness of the meltblown layer 59 or the alternative layer can also be less than 0.1 mm or greater than 0.9 mm. It can also be provided with an air permeability less than 30 l/sm$^2$ or an air permeability greater than 150 l/sm$^2$ with a pressure of approx. 200 Pa.

The coalescing medium 58 can also comprise more or less than five layers of the coalescing material 60.

The coalescing material 60 can also have a percent by weight of between approx. 20% and approx. 50% viscose.

The coalescing material 60 can also have a weight per unit area of greater than or less than 100 g/m$^2$, preferably between 75 g/m$^2$ and 125 g/m$^2$.

Instead of polyester, the coalescing material 60 can also comprise a different synthetic material.

The coalescing material 60 can also have an expandability of less than 15% or greater than 30% in the circumferential direction. In the axial direction, the coalescing material 60 can have an expandability of less than 90% or greater than 150%.

The layers of the coalescing material 60 can also have an average pore diameter of less than 60 μm or greater than 150 μm. The layer thicknesses of the individual layers can also be less than 0.5 mm or greater than 1.5 mm. The air permeability of every individual layer of the coalescing material 60 can also be less than approx. 500 l/sm² at approx. 200 Pa. The total thickness of all five layers of the coalescing material 60 can also be less than 1 mm or greater than 10 mm depending upon the thicknesses of the individual layers.

Instead of being needle bonded, the coalescing material 60 can also be solidified in another manner, for example manufactured by hydroentanglement.

Instead of being folded into a star shape, the filter medium 38 can also be realized as a different hollow body, for example also be unfolded.

Instead of a hollow cylinder, the filter medium 38, the coalescing medium 58 and/or the separating medium 66 can also be realized in another shape, for example as a hollow cone. Instead of round surface areas, they can also be realized with different, for example oval or angular surface areas.

The filter medium 38, the coalescing medium 58 and/or the separating medium 66 can also be arranged in another manner than coaxially to one another or to the filter axis 24.

The ring seal 72 can also be dispensed with. The terminal end plate 40 can preferably fit closely on the radial inner circumferential side of the filter bowl 14.

Instead of in the interior 45 of the filter medium 38, the separating medium 66 can also be arranged radially outwardly, surrounding the filter medium 38 and the coalescing medium 58. The fuel to be cleaned can then flow through the filter medium 38 from the radial inside to the outside. The coalescing medium 58 can then preferably also be located radially outside and surround the filter medium 38.

Instead of being conveyed from the top, the fuel to be cleaned can also be conveyed from the bottom of the raw side of the filter medium 38. The water drainage port 30 can also be arranged eccentrically in the base of the filter bowl 14 instead of centrally.

Instead of the replaceable filter element 36, a corresponding permanently mounted filter element can be provided in the housing 12.

The invention claimed is:

1. A fuel filter for fuel of an internal combustion engine, comprising:
   a housing including:
      at least one fuel inlet for the fuel to be cleaned;
      at least one fuel outlet for cleaned fuel; and
      at least one water outlet for water which has been separated from the fuel;
   a filter element arranged within an interior of the housing, the filter element sealingly separating the fuel inlet from the fuel outlet, the filter element including:
      a filter medium formed in a hollow body, the filter medium permeated from the inside to the outside or from the outside to the inside in order to filter the fuel;
      a coalescing medium formed as a hollow body for separating water contained in the fuel;
      wherein the coalescing medium is arranged downstream of the filter medium in a flow path of the fuel;
      wherein the coalescing medium is arranged circumscribing around said filter medium or in an interior delimited by the filter medium;
      wherein the coalescing medium comprises:
         a pre-coalescing layer formed by a nonwoven layer of spunbond or meltblown synthetic fibers, the pre-coalescing layer arranged on and abutting against the filter medium at a clean side of the filter medium;
         at least one regenerated-fiber coalescing layer consisting of a coalescing material which is suitable for coalescing water and which has at least 20 wt. % regenerated fibers, wherein the regenerated fibers consist of hydrophilic Lyocell fibers or hydrophilic viscose fibers;
         wherein the at least one regenerated-fiber coalescing layer has a larger pore diameter than the pre-coalescing layer;
         wherein the pre-coalescing layer is arranged directly on an upstream regenerated-fiber coalescing layer of the at least one regenerated-fiber coalescing layer;
      wherein the coalescing medium does not contain glass fibers.

2. The fuel filter according to claim 1, wherein the coalescing material of the at least one regenerated-fiber coalescing layer consists of a non-woven material.

3. The fuel filter according to claim 1, wherein the at least one coalescing layer consists of substantially 100% percent by weight Lyocell fibers.

4. The fuel filter according to claim 1, wherein the regenerated fibers of the coalescing material of the at least one regenerated-fiber coalescing layer are viscose fibers; and
wherein the coalescing material comprises a percent by weight of less than 95% viscose fibers.

5. The fuel filter according to claim 4, wherein the coalescing material comprises at least one of: a hydrophobic polyester polymer or polyethylene terephthalate (PET).

6. The fuel filter according to claim 1, wherein the coalescing material of the regenerated-fiber coalescing layer consists substantially of viscose fibers having a percent by weight of approx. 80% and a hydrophobic polymer having a percent by weight of approx. 20%.

7. The fuel filter according to claim 1, wherein the pre-coalescing layer synthetic fibers are polyester.

8. The fuel filter according to claim 1, wherein the at least one coalescing layer is a plurality of abutting layered coalescing layers having a percent by weight of at least 80% by weight regenerated fibers.

9. The fuel filter according to claim 1, wherein the coalescing material of the at least one regenerated-fiber coalescing layer has a weight per unit area of between 75 g/m2 and 180 g/m2; or
the synthetic fibers of the pre-coalescing layer has a weight per unit area of between 80 to 120 g/m2.

10. The fuel filter according to claim 1, wherein the coalescing material of the at least one regenerated-fiber coalescing layer has an average pore diameter of approx. 60 to 150 μm; or
wherein the pre-coalescing layer has an average pore diameter of approx. 1 to 30 μm.

11. The fuel filter according to claim 1, wherein the coalescing medium is circumferentially wrapped around and onto the filter medium.

12. The fuel filter according to claim 1, wherein
the coalescing material of the at least one regenerated-fiber coalescing layer or the pre-coalescing layer comprises an expandability or elasticity in the circumferential direction of the coalescing medium, which is less than the expandability or elasticity thereof in the axial direction of the coalescing medium.

13. The fuel filter according to claim 1, wherein
the at least one coalescing layer consists of viscose fibers having a percent by weight of approx. 80% and a hydrophobic polymer having a percent by weight of approx. 20%.

14. A filter element of a fuel filter for fuel of an internal combustion engine which can be arranged in a housing of the fuel filter in such a way that it sealingly separates a fuel inlet of the housing from a fuel outlet, and which comprises:
   a filter medium formed in a hollow body, the filter medium permeated from the inside to the outside or from the outside to the inside in order to filter the fuel;
   a coalescing medium formed as a hollow body for separating water contained in the fuel;
   wherein the coalescing medium is arranged downstream of the filter medium in a flow path of the fuel;
   wherein the coalescing medium comprises:
      a pre-coalescing layer formed by a nonwoven layer of spunbond or meltblown synthetic fibers, the pre-coalescing layer arranged on and abutting against the filter medium at a clean side of the filter medium;
      at least one regenerated-fiber coalescing layer consisting of a coalescing material which is suitable for coalescing water and which has at least 20 wt. % regenerated fibers, wherein the regenerated fibers consist of hydrophilic Lyocell fibers or hydrophilic viscose fibers;
      wherein the at least one regenerated-fiber coalescing layer has a larger pore diameter than the pre-coalescing layer;
      wherein the pre-coalescing layer is arranged directly on an upstream regenerated-fiber coalescing layer of the at least one regenerated-fiber coalescing layer;
   wherein the coalescing medium does not contain glass fibers.

15. The filter element according to claim 14, wherein
the at least one coalescing layer consisting of a coalescing material has at least 50 wt. % regenerated fibers.

16. The filter element according to claim 14, wherein
the at least one coalescing layer consists of substantially 100% by weight Lyocell fibers.

17. The filter element according to claim 14, wherein
the at least one coalescing layer consists of viscose fibers having a percent by weight of approx. 80% and a hydrophobic polymer having a percent by weight of approx. 20%.

* * * * *